Dec. 12, 1961   H. BOLZMANN   3,013,246
ECHO SOUNDER FOR SHIPS
Filed Feb. 26, 1959   2 Sheets-Sheet 2

United States Patent Office 3,013,246
Patented Dec. 12, 1961

3,013,246
ECHO SOUNDER FOR SHIPS
Hans Bolzmann, Kiel, Germany, assignor to Electro-acustic Gesellschaft mit beschrankter Haftung, Kiel, Germany, a corporation of Germany
Filed Feb. 26, 1959, Ser. No. 795,786
Claims priority, application Germany Feb. 27, 1958
14 Claims. (Cl. 340—3)

My invention relates to sonic apparatus for echo sounding by means of a sonic pulse transmitter, an echo receiver and an echo recorder, particularly for tracking sonic reflectors, such as fish, that are located closely above the sea bottom.

In recording echo sounders, the echo signals are reproduced on electrically sensitive paper tape by means of a stylus which periodically travels at uniform speed and in synchronism with the recurrent pulse transmission across the tape in a direction transverse of the advancing motion of the tape. During each cycle of stylus motion and pulse transmission, the stylus first produces a record of the original sonic pulse being transmitted, and thereafter records any echo pulses coming from reflectors present in the water, and ultimately also records the echo from the sea bottom. If there are weakly reflecting objects, for example fish, closely above the strongly reflecting sea bottom, it is difficult to discern the recording marks of such objects because an only small change in receiver voltage suffices to produce maximum blackening of the recording paper. If one adjusts the amplification of the receiver voltage so that the intensive echo from the sea bottom is recorded with maximum blackening, the weaker echoes reflected from fish are recorded in gray, but the apparatus is then incapable of indicating all fish. If the amplification is made so great that the weakest fish echoes are recorded, then the stronger fish echoes already appear in deep black and hence are no longer discernible from the record of the bottom echo. A number of methods and devices have become known to cope with such difficulties of identifying fish echoes from the vicinity of the sea bottom.

According to one of these known methods, the amplification of the received echo signals is periodically varied in accordance with a time program whose cycle period departs from the cycle of pulse transmission, so that different degrees of amplification apply to the same respective phases of successive cycles of echo reception. This makes the indication of fish echoes distinguishable from that of the bottom echo. However, due to the varying amplification, not all fish are indicated in each sounding cycle. A similar effect with the same disadvantage can be obtained by periodic intensity variation of the transmitter pulse.

According to another known method, the zero point of the echo recording is automatically displaced by shifting the recording tape transverse to its advancing direction in such a manner that the bottom echo always appears as a straight horizontal line. Then any records of weaker reflectors, such as fish, as may be located near the sea bottom, will depart from the straight line. With this method, all fish echoes are recorded during each sounding cycle. However, the actual configuration of the sea bottom is not indicated, and it becomes extremely difficult to judge the depth of the fish being tracked, although knowledge of that depth is important for best setting of the fish catching devices. Furthermore, such an electro-mechanical zero-point displacement is relatively sluggish.

In another known sounding device, the received and amplified echo signals are passed through two channels. An amplitude limiter in one receiving channel clips off all amplitudes that exceed a given value, whereas only signals of greater amplitudes can pass through the second channel. The separated signals are amplified either in separate amplifiers or in a common non-linear amplifier so that the signals of the first channel are recorded in gray and those of the second channel in black. As a result, the intensive bottom echo is recorded black and the echoes of any fish closely above the bottom are recorded in gray. Aside from the fact that such a device involves an undesirably great expenditure in components and space, it has the disadvantage that just those reflectors that are of main interest to the fisherman are only faintly recorded, whereas the sea bottom is recorded very intensively.

It is an object of my invention to achieve in a simple manner a recording of sonic echo signals which readily permits a definite identification of reflectors closely above the sea bottom, and which affords an intensive and well legible record of such echoes without detriment to the clarity and fidelity of the bottom echo.

To this end, and in accordance with my invention, I provide between the receiving amplifier and the recording stylus of the recorder an electronic switch, such as an electronic tube, so controlled as to periodically close and open the stylus-energizing circuit relative to echo signals whose amplitudes exceed a given adjustable value. As a result, the sea bottom is recorded as a rastered or hatched strip, whereas any reflectors, such as fish, located above the sea bottom are recorded without such rastering.

By virtue of the invention the sea bottom appears on the recorder tape as a hatched area because the bottom echo is not recorded in each sounding cycle, in contrast to the echoes coming from more weakly reflecting objects. Consequently, such objects as schools of fish in proximity of the sea bottom are recorded in full-black or dark color above a bottom record which appears as a striped area, whose stripes extend at an angle, preferably a right angle, to the advancing direction of the recording tape. With such a record, the fish echoes and the bottom echo are always readily distinguishable, the mainly interesting fish echoes being recorded intensively although the contour of the sea bottom can also be read off unambiguously.

The control program for operating the electronic switch to record the bottom echo in raster fashion, may be so chosen that the electronic switch is alternately opened and closed in uniform intervals of time of which each corresponds to the same given number of sounding cycles. However, the control program may also be such that the electronic switch is alternately closed and opened in respectively different time intervals corresponding to respectively different numbers of sequential sounding cycles.

The switch control, according to another feature of my invention, is effected by mechanical means, preferably with the aid of a rotary cam which turns one step after each sounding cycle. According to another, alternative feature, the control is effected by means of another electronic switch which may be coupled with an electronic counting device and which operates to close and open the stylus control switch periodically in accordance with an adjustable time program.

According to still another feature of my invention, the closing intervals of the electronic switch in the energizing circuit of the recorder stylus is adjustable within the sounding cycles in such a manner that the rastered strip record of the bottom echo has a desired width. This permits drawing additional conclusions from the record of the bottom echo as to the condition of the sea bottom.

The invention will be further explained with reference to the accompanying drawing in which.

Figure 1:
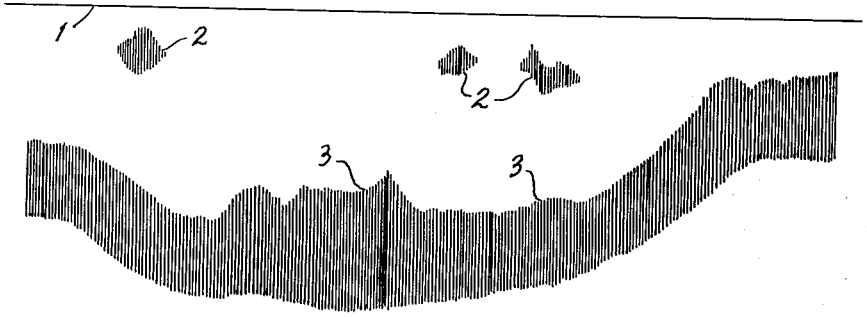
FIG. 1 shows an example of an echogram as produced with a known echo sounder.
Figure 2A:
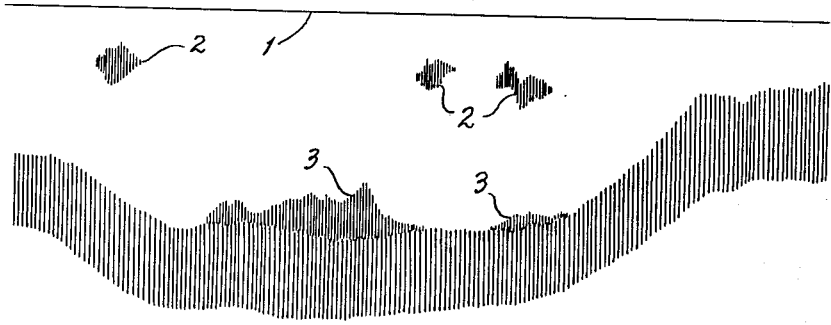
FIGS. 2a and 2b show respectively different echograms as obtained with an echo sounder according to the invention.
Figure 2B:
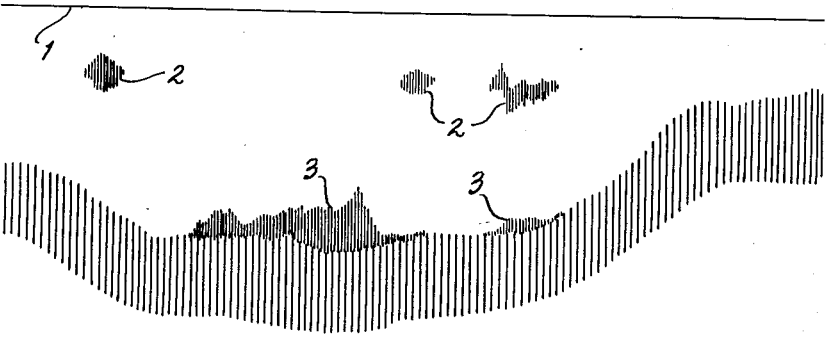

In the examples of records shown in FIGS. 1, 2a and 2b, the straight line denoted by 1 is the record produced by the transmitter pulses and hence represents the zero reference line. A number of echo signals reflected from fish are denoted by 2 and 3. The signals 3 stem from fish located closely above the sea bottom. While in the diagram of FIG. 1 the echoes 3 are not distinguishable from the record 4 of the sea bottom, the recorder diagrams made according to the invention and exemplified in FIGS. 2a and 2b clearly distinguish the fish echoes 3 from the hatched bottom record 4 without impairing the indication of the sea-bottom contour. FIGS. 2a and 2b differ from each other only by a different ratio of the closing and opening periods of the time-controlled and pulse-intensity responsive switching device used according to the invention between the echo receiver and the echo recorder and described below with reference to FIG. 3.

Figure 3:
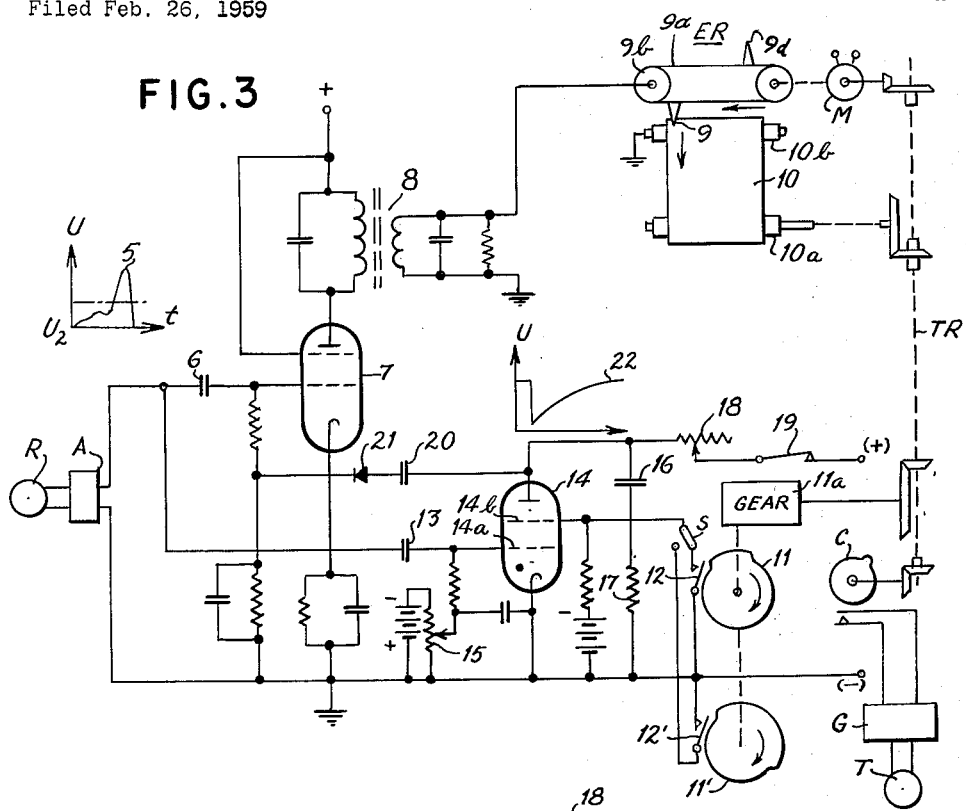
FIG. 3 shows schematically and by way of example an embodiment of a complete echo sounding apparatus according to the invention.

The echo sounder shown in FIG. 3 is provided with a sonic transmitter T operating in the audible or ultrasonic range which issues periodic sounding pulses and is energized from a pulse generator G under control by a mechanical contact device with a rotatable control cam C driven through a suitable transmission TR from the drive M of an echo recorder ER. The transmission TR is schematically represented by a number of gears and connecting shafts although it will be understood that the particular design of the transmission is not essential and can be modified in any desired way. The sounder is further provided with a sonic receiver R which is connected, through an amplifier A and the circuit components described below, with the stylus control circuit of the recorder ER. During each cycle of pulse transmission, the receiver first receives a direct pulse signal at the moment when the sounding pulse is being issued from the transmitter T, and this causes the recorder ER to produce a mark which, during a sequence of successive sounding cycles, forms the above-mentioned zero line 1. (FIGS. 2a, 2b.) Thereafter the receiver R receives echo signals from any objects located in the sounding range, and ultimately an echo signal reflected from the sea bottom, these echoes being recorded in recorder ER by such recording marks as shown at 2 and 3 (FIGS. 2a, 2b).

More in detail, the echo pulse responded to by the receiver R may have the wave shape shown at 5. This pulse, upon amplification in amplifier A, passes through a coupling capacitor 6 onto the control grid of an electronic tube 7 and from the tube through a transformer 8 to the stylus 9 of the recorder ER to produce a mark on the paper tape 10 of the recorder. The stylus 9 is shown, by way of example, to be mounted on an endless belt or chain 9a which passes around sheaves or sprockets 9b and 9c driven from a motor M. During each cycle period of the above-described transmitter assembly, corresponding to one full revolution of cam C, the stylus 9 passes once across the recording tape 10 in a direction transverse to the advancing motion of the tape which is imparted to the tape from motor M through a portion of the transmission TR connected to feed rollers 10a, 10b in frictional or sprocket engagement with the tape 10. As soon as the stylus 9 has completed a pass across the recorder tape 10, another stylus 9d commences to travel across the paper during the next following cycle of pulse transmitting operation.

The echo pulse 5 also passes from amplifier A onto the control grid of a switching tube 14, for example a thyratron. The grid bias voltage of the thyratron is adjustable by means of a resistor 15 to such a value that the tube is ignited only by echo pulses whose amplitudes exceed a given value $U_z$, this being the case with the pulses reflected from the sea bottom. When tube 14 is thus switched on, a capacitor 16, previously charged through resistors 17 and 18, is discharged through tube 14 and resistor 17. This produces a negative pulse 22 in the plate circuit of tube 14. The negative pulse is supplied through a capacitor 20 and a diode 21 to the control grid of tube 7 and makes tube 7 non-conductive until the normal grid bias voltage of tube 7 has adjusted itself through the resistors 17 and 18. During this operation, the diode 21 is effective to block the passage of the positive pulse which occurs behind the capacitor 20 due to the ascending rear flank of the pulse 22. The duration of the just-mentioned blocking effect upon tube 7 within each cycle period of sounding operation can be adjusted at will by varying the resistance of resistor 18 and/or by varying the capacitance of capacitor 16. However, the blocking effect upon tube 7 can take place only when one of two contacts 12, 12' in the control circuit of thyratron 14 is closed. The contacts 12 and 12' are connected in parallel to each other but only one of them is active at a time depending upon the chosen setting of a program selector switch S. With switch S in the illustrated position, only contact 12 is effective. As long as contact 12 is open, the second grid of thyratron 14 is subjected to a negative bias voltage of such a high magnitude that the thyratron cannot be ignited and the tube 7 remains conductive for all signals received, including those of high intensity. Contact 12 is actuated periodically by a rotatable cam disc 11 which advances a given angle of rotation upon completion of each sounding cycle. For this purpose, the cam 11 is shown connected through a gear mechanism 11a and the transmission TR with the recorder drive M. The gear mechanism 11a may have a transmission ratio so chosen that the contact 12 closes during each second or third transmission cycle or in any other repetitive sequence, and then remains closed for a given number of cycles. If desired, the gear mechanism 11a may be given an adjustable transmission ratio so that the ratio of closing to opening periods of contact 12 may be set at will.

The contact 12' is controlled by another cam 11' driven from transmission TR in the same manner as the cam 11 but provides for a different ratio of opening to closing periods of the cam-controlled contact. For simplicity, only one cam lobe is shown for each of cams 11 and 11'. The lobe of cam 11' extends over one-half of the cam periphery so that the opening and closing periods of contact 12' are equal, each comprising the same integral plurality of sounding cycles. The lobe of cam 11 is shorter than one-half of the cam periphery so that the opening periods of contact 12 are longer than its closing periods, the two periods being equal to different numbers of full sounding cycles respectively.

Instead of connecting the contact 12 or 12' in the manner shown, it may also be connected in the plate circuit of tube 14 in order to periodically interrupt the plate voltage. In this case, the location of contact 12 or 12' may correspond to that of switch 19, which in the illustrated embodiment is additionally provided for the purpose of manually setting the device for recording the bottom echo without hatching, so that the echo sounder can also be used for operation in the known manner represented by FIG. 1.

It will be recognized that when switch 19 is closed and contact 12 or 12' is in operation as described above, the recording of the bottom echo in recorder ER takes place intermittently by skipping one or more sounding cycles, whereas the echoes of weaker reflectors above the sea bottom, for example fish, are recorded during each individual sounding cycle.

While in the illustrated embodiments the electronic switching device is exemplified by tube 7 in combination with thyratron 14, other electronic switching means, such as switching transistors, may be used instead. Furthermore, the mechanical switch 11, 12 may be substituted by another electronic switch such as a thyratron or switching transistor, or the necessary synchronism between the operation of the periodic switching means and the cycle of the sounding operation may be secured by other than mechanical means. For example, the mechanical switch 11, 12 may be substituted by an electronic switch coupled with an electronic counting device responsive to the issuance of the transmitter pulses, or the entire periodically operating blocking device responsive to receiver signals above a given intensity can be formed by a combination of multivibrators. Such modifications are exemplified by FIG. 4 which shows only a portion of a system otherwise similar to that shown in FIG. 3.

Figure 4:
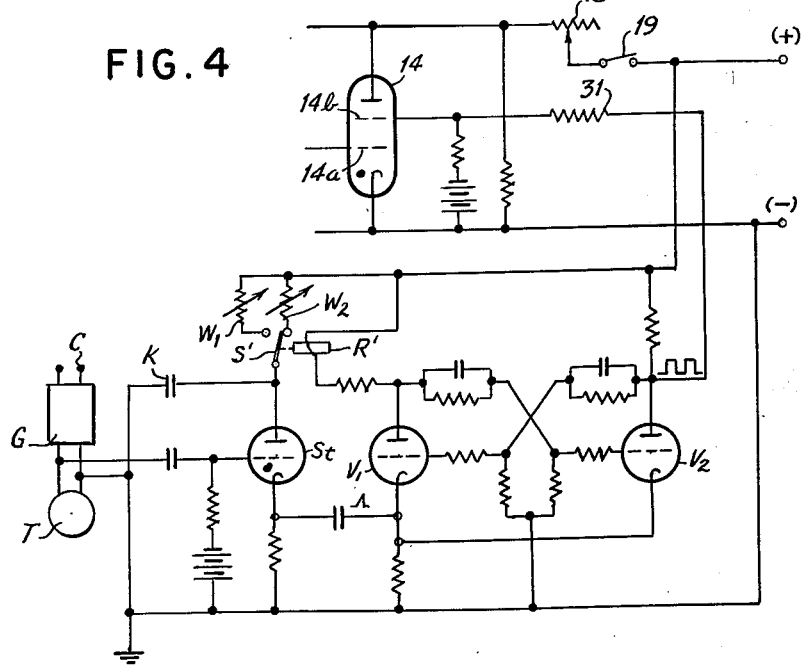
FIG. 4 is a circuit diagram of a modified portion of an apparatus otherwise as shown in FIG. 3.

According to FIG. 4 the control grid of a thyratron $St$, normally subjected to a negative cut-off bias, receives positive pulses from the pulse generator G in synchronism with the sounding pulses issuing from the transmitter T. The positive pulses can ignite the thyratron $St$ only if a capacitor K is sufficiently charged through a resistor $W_1$ or $W_2$. If a positive pulse arrives at a moment when a sufficient capacitor charge is available, the capacitor K discharges through the thryatron $St$. The pulse current then flowing through the plate circuit of the thyratron $St$ serves as a keying signal for triggering a bi-stable multivibrator composed of two electronic tubes $V_1$ and $V_2$ and has the effect that the multivibrator flips from one to its other stable condition. A rectangular-wave voltage taken from the anode of tube $V_2$ is supplied through a resistor 31 to the grid $14b$ of the thyratron 14.

When tube $V_2$ conducts, a positive voltage compensates the negative bias voltage on grid $14b$, and the thyratron 14 can ignite. This condition corresponds to that obtaining when the contact 12 or 12′ in FIG. 3 is closed. When tube $V_2$ is cut off, the thyratron 14 cannot ignite because of the negative cut-off bias imposed on its grid $14b$. This condition corresponds to one obtaining when the contact 12 or 12′ in FIG. 3 is open.

In order to adjust at will the lingering period of the bi-stable multivibrator in each of its stable conditions, the two resistors $W_1$ and $W_2$ for charging the capacitor K are manually adjustable and are alternately connected with the capacitor K through a switch contact S′ of an electromagnetic relay R′. Capacitor K is charged through resistor $W_1$ when tube $V_1$ is cut off, and is charged through resistor $W_2$ when the tube $V_1$ is conducting. In general, the resistors $W_1$ and $W_2$ are set to respectively different resistance values, in which case the closing and opening periods of the main electronic switch (7 in FIG. 3) have respectively different durations. Of resistors $W_1$ and $W_2$ are adjusted to the same value, the opening and closing periods of the main electronic switch (7 in FIG. 3) are of equal duration. If the echo sounder is to operate exclusively with equal closing and opening periods of the main electronic switch, one of the two resistors $W_1$, $W_2$ and the relay R′, S′ can be eliminated.

It will be obvious to those skilled in the art upon a study of this disclosure that various other modifications are available and permit embodying the invention in apparatus other than particularly illustrated and described herein, without departing from the essential features of my invention and within the scope of the claims annexed hereto.

I claim:

1. A submarine sonic echo sounder, comprising an echo receiver, a recorder having a cyclically travelling marking device electrically connected with said receiver to perform a marking operation under control by the echo signals received, electronic switching means interposed between said receiver and said marking device, said switching means having a control circuit connected to said receiver and responsive to signals above a given intensity to switch off said marking device, and periodic control means independent of said receiver and synchronous with the travel cycle of said marking device, said control means being connected with said control circuit for rendering it periodically inactive during recurrent cycle periods of said device, whereby said recorder records low-intensity signals during each cycle of said marking device and high-intensity signals only during intermittently recurring cycle periods.

2. In an echo sounder according to claim 1, said periodic control means having switch-on and switch-off periods of equal duration, each being equal to an integral number of full cycles of said marking device.

3. In an echo sounder according to claim 1, said periodic control means having switch-on and switch-off periods of respectively different durations, each being equal to an integral number of full cycles of said marking device.

4. In an echo sounder according to claim 1, said periodic control means comprising a mechanical switch device, said marking device having a drive for imparting cyclical travel to said device, and transmission means connecting said switch device with said drive for periodically actuating said switch device in synchronism with said travel.

5. In an echo sounder according to claim 1, said periodic control means comprising a rotatable cam and a mechanical switch contact actuable by said cam, said recorder having feed-means for longitudinally advancing a record tape and having a drive connected with said feed means for advancing the tape, said drive being also connected with said marking device for imparting thereto a cyclical travel across the tape, and transmission means connecting said drive with said cam for rotating said cam in synchronism with said travel cycle.

6. A submarine sonic echo sounder, comprising an echo receiver, a recorder having a cyclically travelling marking device connected with said receiver to perform a marking operation controlled by the echo signals received, normally closed electronic switching means interposed between said device and said receiver and a control circuit connected to said receiver and responsive to signals above a given intensity to open said switching means, and periodic control means synchronous with the cycle of said marking device and connected with said control circuit for periodically inactivating said intensity-responsive control circuit during periodically recurrent travel cycles of said marking device, whereby said recorder is capable of recording low-intensity signals during each travel cycle and high-intensity signals only during intermittently recurrent cycles.

7. A submarine echo sounder, particularly for fishing vessels, comprising a sonic pulse transmitter, an echo signal recorder having a cyclically travelling marking device, synchronizing means connecting said marking device with said transmitter, a sonic receiver, an amplifier connected between said receiver and said marking device for controlling the marking operation of said device in dependence upon the echo signals received, electronic switching means connected with said marking device for switching its marking operation on and off, said switching means having a control circuit connected to said receiver and responsive to signals above a given intensity to switch off said marking device, and periodic control means independent of said receiver and synchronous with the cycle of said marking device and connected with said switching means for periodically keeping said marking device switched on during periodically recurrent cycle periods of said device and irrespective of the signal intensity, whereby said recorder records the sea bottom by raster marks but records the presence of fish by full marks.

8. A submarine echo sounder, particularly for fishing vessels, comprising a sonic pulse transmitter, an echo signal recorder having a cyclically operating marking device, synchronizing means connecting said device with said transmitter, a sonic receiver, an amplifier connected between said receiver and said marking device for controlling the marking operation of said device in dependence upon the echo signals received, a normally closed electronic switch connected in series between said amplifier and said marking device and having a control circuit for opening said electronic switch to inactivate said device, first control means connected between said amplifier and said control circuit and responsive to echo signals above a given minimum intensity to open said electronic switch, said first control means having adjusting means for selecting said minimum intensity, and second control means of periodic operation connected with and controlled by said synchronizing means, said second control means being connected with said first control means for periodically inactivating said first control means during periodically recurrent travel cycles of said marking device, whereby said recorder records low-intensity signals during each cycle of said device and high-intensity signals only during intermittently recurrent cycles.

9. In an echo sounder according to claim 8, said electronic switch consisting essentially of an electronic tube having a plate circuit connected between said amplifier and said marking device and having a control grid forming part of said control circuit.

10. A submarine echo sounder, comprising a sonic pulse transmitter, an echo signal recorder having a cyclically travelling marking device, synchronizing means connecting said marking device with said transmitter, a sonic receiver, an amplifier connecting said receiver with said marking device for controlling the marking operation of said device in dependence upon the echo signals received, electronic switching means connected with said marking device for switching its marking operation on and off, said switching means having a control circuit connected to said amplifier and responsive to amplified signals above a given intensity to switch off said marking device, periodic control means connected with said switching means for keeping said marking device switched on during periodically recurrent cycle periods of said marking device, and transmission means connecting said control means with said synchronizing means and comprising an adjustable device for programming the periodic operation of said control means.

11. A submarine echo sounder comprising a sonic pulse transmitter, an echo signal recorder having a cyclically travelling marking device, synchronizing means connecting said marking device with said transmitter, a sonic receiver, an amplifier connected between said receiver and said marking device for controlling the marking operation of said device in dependence upon the echo signals received, electronic switching means connected with said marking device for switching its marking operation on and off, said switching means having a control circuit connected to said receiver and responsive to signals above a given intensity to switch off said marking device, and periodic control means independent of said receiver and synchronous with the travel cycle of said marking device and connected with said switching means for keeping said marking device switched on during periodically recurrent cycle periods of said device, said control means comprising a pulse counter connected with said transmitter, and an auxiliary electronic switch connected with said counter to be on-off controlled upon counting of a given number of transmitter pulses, said auxiliary electronic switch being connected with said switching means for controlling the latter.

12. A submarine echo sounder comprising a sonic pulse transmitter, an echo signal recorder having a cyclically travelling marking device, synchronizing means connecting said marking device with said transmitter, a sonic receiver, a normally conductive electronic tube having a plate circuit connected with said marking device and having a grid circuit connected to said receiver for controlling the marking operation of said device in dependence upon the echo signals received, a normally open electronic switching device having a control circuit connected to said receiver, an adjustable source of bias voltage connected to said control circuit for causing it to close said switching device only when the echo signals exceed a given intensity depending upon said bias voltage, a source of cut-off pulse voltage connected through said switching device with said tube when said switching device is closed whereby said tube is cut off for signals above said intensity, and periodic control means independent of said receiver and synchronous with the cycle of said marking device and connected with said switching device for preventing it from closing during recurrent cycle periods of said marking device, whereby said recorder records low-intensity signals during each cycle of said marking device and high-intensity signals only during intermittently recurring cycle periods.

13. In an echo sounder according to claim 12, said source of cut-off pulse voltage comprising a timing circuit having capacitor means and resistor means, a current source connected with said capacitor means for charging said capacitor means, and diode means interposed between said switching device and said tube, whereby closing of said switching device causes discharge of said capacitor to supply said cut-off pulse voltage through said diode means to said tube.

14. In an echo sounder according to claim 12, said switching device comprising a thyratron having two cut-off grids of which one is connected with said receiver and with said source of bias voltage, said periodic control means being connected with said other thyratron grid, and said thyratron having an anode circuit connected with said source of pulse voltage and with said grid circuit of said tube.

No references cited.